United States Patent
Boot et al.

(10) Patent No.: US 8,202,464 B2
(45) Date of Patent: Jun. 19, 2012

(54) METHOD AND SYSTEM FOR LAYERWISE PRODUCTION OF A TANGIBLE OBJECT

(75) Inventors: Ronaldus Jacobus Johannes Boot, Son en Breugel (NL); Herman Hendrikus Maalderink, Nuenen (NL)

(73) Assignee: Nederlandse Organisatie Voor Toegepast-Natuurwetenschappelijk Onderzoek TNO, Delft (NL)

( * ) Notice: Subject to any disclaimer, the term of this patent is extended or adjusted under 35 U.S.C. 154(b) by 237 days.

(21) Appl. No.: 12/307,070

(22) PCT Filed: Jul. 10, 2007

(86) PCT No.: PCT/NL2007/050340
§ 371 (c)(1),
(2), (4) Date: Mar. 6, 2009

(87) PCT Pub. No.: WO2008/007956
PCT Pub. Date: Jan. 17, 2008

(65) Prior Publication Data
US 2009/0236778 A1  Sep. 24, 2009

(30) Foreign Application Priority Data
Jul. 11, 2006 (EP) .................................. 06076405

(51) Int. Cl.
*B28B 3/10* (2006.01)
(52) U.S. Cl. ........ 264/308; 264/497; 264/401; 264/335; 425/271; 425/149

(58) Field of Classification Search .................. None
See application file for complete search history.

(56) References Cited

U.S. PATENT DOCUMENTS

| | | | | |
|---|---|---|---|---|
| 5,529,473 A | * | 6/1996 | Lawton et al. | 425/174.4 |
| 5,870,307 A | * | 2/1999 | Hull et al. | 700/182 |
| 2003/0205849 A1 | * | 11/2003 | Farnworth | 264/401 |
| 2004/0159967 A1 | * | 8/2004 | Farnworth | 264/71 |

FOREIGN PATENT DOCUMENTS

| | | |
|---|---|---|
| DE | 10204985 A1 | 8/2003 |
| DE | 10256672 A1 | 6/2004 |
| JP | 08-150662 | 6/1996 |

OTHER PUBLICATIONS

Office Action issued in corresponding European Patent Application No. 07834630.1 and dated Jun. 10, 2011.

* cited by examiner

*Primary Examiner* — Robert J Hill, Jr.
*Assistant Examiner* — Ninh Le
(74) *Attorney, Agent, or Firm* — Lucas & Mercanti, LLP

(57) ABSTRACT

A method cycle of a method for layerwise production of a tangible object (5) comprises the successive steps of: solidifying a predetermined area of a layer (10) of a liquid (3), said liquid layer adjoining a construction shape (6), so as to obtain a solid layer (14) having a predetermined shape; separating said solid layer from said construction shape; and moving the separated solid layer and the construction shape to a predetermined position relative to one another for letting the liquid flow-in between the separated solid layer and the construction shape. Reduced pressure is applied to at least one fluid, such as the liquid (3).

17 Claims, 2 Drawing Sheets

METHOD AND SYSTEM FOR LAYERWISE PRODUCTION OF A TANGIBLE OBJECT

FIELD AND BACKGROUND OF THE INVENTION

The invention relates to a method for layerwise production of a tangible object according to the preamble of claim 1. The invention also relates to a system for layerwise production of a tangible object. The invention furthermore relates to a controller for use in such a system, as well as to a computer program product, including program code portions for performing the function of such a controller.

Such a method is known. For example it is known from DE10256672A1 that the liquid reservoir has a transparent bottom plate whose upper side has a separation layer. In the space above the bottom plate there is a carrier plate which can be moved up and down. During its movement, the carrier plate can reach positions ranging from under the liquid level to above it. A firstly formed solid layer of the tangible object is adhered to the underside of the carrier plate. Consecutively formed solid layers are each adhered to a previously formed solid layer, respectively.

Each time after solidification of a new layer, the carrier plate together with the earlier solidified layers adhered thereon are moved upwards in order to separate the last formed solid layer from the separation layer of the bottom plate. Each time after such separation, the separated solid layer is moved to a predetermined position at a distance from the separation layer of the bottom plate for letting the liquid flow-in between the separated solid layer and the separation layer of the bottom plate. By solidifying a predetermined area of a layer containing the flow-in liquid, a successive solid layer of the tangible object is obtained.

The upward separation movement of the carrier plate requires an external force to be exerted on the carrier plate. This external force results in an increase of internal stresses in the tangible object being produced. Especially vertical tensile stresses in objects with varying cross-sections can become locally very high. If these stresses become too high, the object can deform, deteriorate or break. Since, for the known method, a fast separation requires the external force to be high, the internal stresses in the tangible object during such fast separation are high as well. Thus, a drawback of the known method is, that there are only limited kinds of objects that can be rapidly formed. Other kinds of objects, especially those with strongly varying cross-sections, can not be rapidly formed with the known method.

SUMMARY OF THE INVENTION

It is an object of the invention to enable a faster production of a tangible object.

Therefore, according to a first aspect of the invention, a method according to claim 1 is provided.

In this method according to the first aspect of the invention, at least temporarily during the performing of at least one such method cycle, reduced pressure, relative to the outside environment, is applied to at least one fluid, such as the liquid in the liquid reservoir, wherein the at least one fluid is contacting layers of the object under production that were solidified in method cycles that were performed previously to the at least one such method cycle. Favourable effects of such reduced pressure application are elucidated as follows.

During fast separation of the last formed solid layer from the construction shape, there is a period of time in which the liquid (resin) is not in equilibrium with the forces/pressures in the interspace between the solid layer and the construction shape. Then, a reduced pressure (of the vacuum or gaseous liquid) is created in said interspace, resulting in a force to let the liquid flow in the expanding interspace. Hence, then there exists a pressure difference between the (low) pressure in said interspace and the (high) pressure exerted by the at least one fluid on the contacted layers (note that, for the known method, the pressure in a space above and adjoining the liquid level is the usual environmental pressure, i.e. the atmospheric pressure). The presence of said pressure difference is responsible for a great deal of required external force action necessary for separating the solid layer from the construction shape, especially for objects with (strongly) varying cross-sections. The exertion of this great deal of external force action, on its turn, is responsible for an increase of internal stresses in the object during said separation.

By applying the reduced pressure to the at least one fluid, said pressure difference is decreased. Therefore, that part of the required external force action which is necessary for overcoming said pressure difference is decreased, as a result of which that part of the required external force action contributes to a lesser extent to said increase of internal stresses in the object. This allows that, given a maximum permissible internal stress level, a greater share of the external force is available for overcoming other types of resistances occurring during separation. In other words, applying the reduced pressure results in a smaller share of external force wasted for overcoming said pressure difference and hence in a larger share of external force available for the benefit of achieving acceleration of the separation. Hence, the separation steps in the method of producing the tangible object can be accelerated, even (and in fact especially) for objects with strongly varying cross-sections.

In addition, applying the reduced pressure has another favourable effect, which is elucidated as follows. According to the method, the separation step is followed by a positioning step in which, the separated solid layer and the construction shape are moved, relative to one another, to a predetermined position relative to one another for letting the liquid flow-in between the separated solid layer and the construction shape. Normally, there occurs directly after completion of the separation a so-called "overshoot" in this relative movement. That is, in an initial stage of the positioning step, the separated solid layer and the construction shape are moved further apart than desired. This overshoot has to be compensated by moving, during a later stage of the positioning step, the separated solid layer and the construction shape closer together again. During this compensatory movement, surplus of liquid which has meanwhile entered the interspace between the separated solid layer and the construction shape, has to be forced out of this interspace again. This forcing out is time consuming, especially when the construction shape is flexible.

By applying the reduced pressure to the at least one fluid, at least the following two advantages are obtained. In the first place, the corresponding reduced pressure difference that has to be overcome during the initial stage of the separating step, results in a diminished extent of the overshoot. This occurrence of less overshoot, already in itself, accelerates the positioning step, since there is less overshoot to be compensated in the positioning step. Secondly, apart from the first advantage, applying the reduced pressure furthermore accelerates said forcing out of surplus of liquid, since in forcing out there is less pressure difference that has to be overcome.

Hence, not only the separation steps, but also the positioning steps in the method of producing the tangible object can be accelerated.

Furthermore, according to a second aspect of the invention, a system according to claim 9 is provided. According to a third aspect of the invention, a controller according to claim 12 is provided. According to a fourth aspect, a computer program product according to claim 13 is provided.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

DETAILED DESCRIPTION

Figure 1:
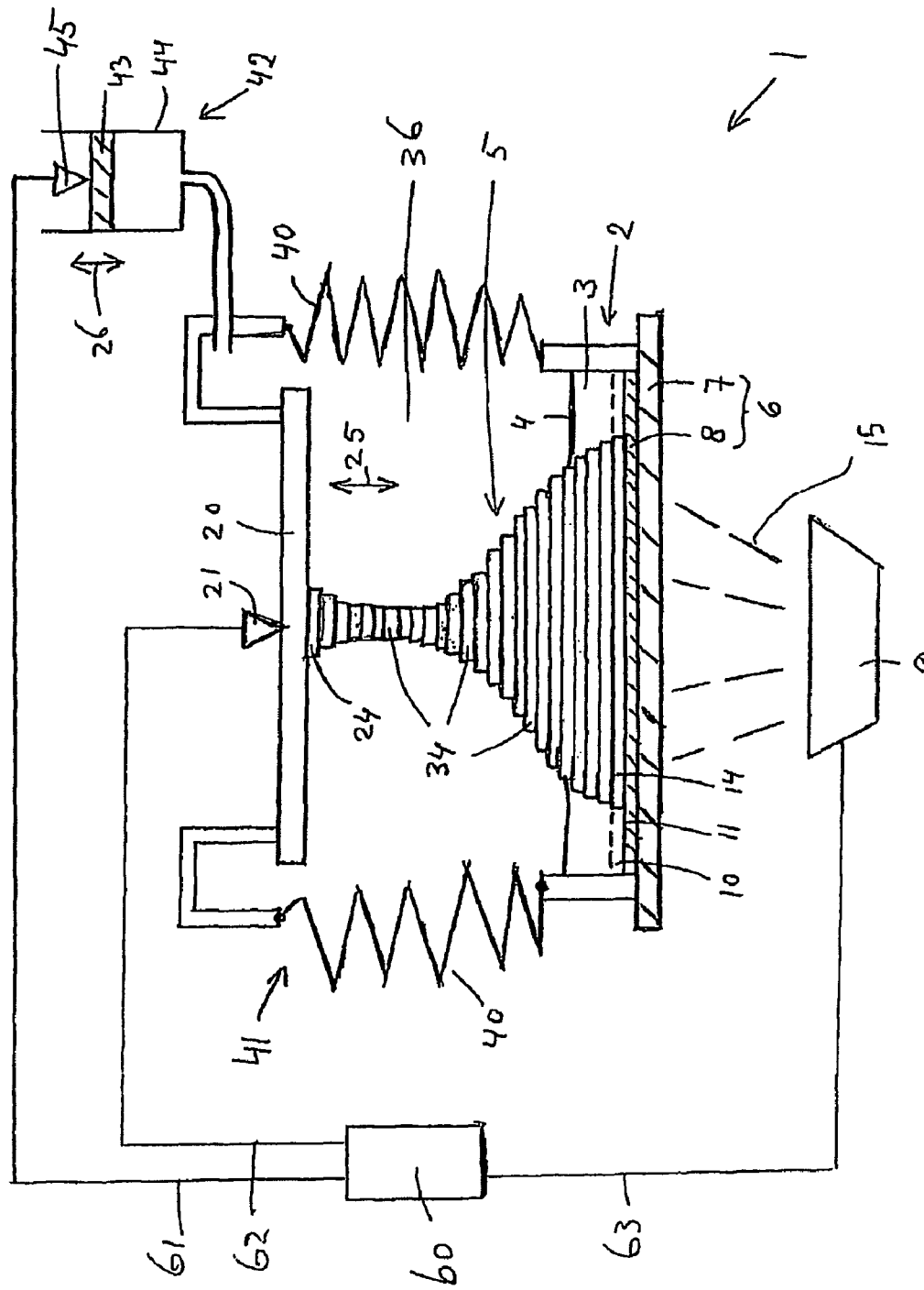
FIG. 1 schematically shows a sectional side view of an example of an embodiment of a system according to the invention.
Figure 2:
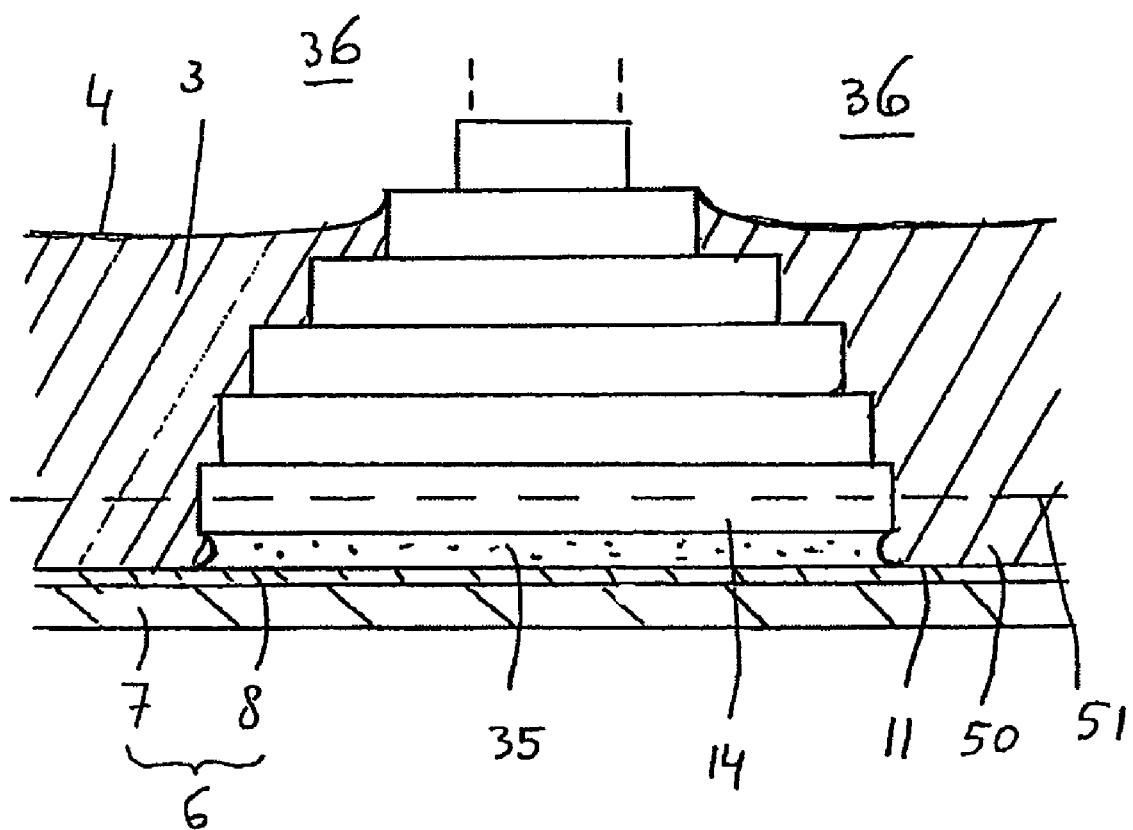
FIG. 2 schematically shows a fragmentary view of the system of FIG. 1 during a stage of a method according to the invention.

Reference is made to FIGS. 1 and 2 which show an example of a system 1 for layerwise production of a tangible object 5. The system 1 can perform an example of a method for layerwise production of a tangible object. The tangible object 5 is shown while being produced. It may for example be a prototype or model of an article of manufacture or other suitable type of object.

The system 1 comprises a liquid reservoir 2 which, in the shown example, is filled with a liquid 3 upto a liquid level 4. The system 1 further comprises a construction shape 6 which is positioned below the liquid level 4 in the liquid reservoir 2. In the shown example the construction shape 6 comprises a bottom platform 7 of the reservoir 2, as well as, on top of the platform 7, an anti-stick layer 8, such as a rubber-like layer or a silicon layer. However, many other types and shapes of construction shapes can be applied instead.

The system 1 further comprises solidifying means 9 for solidifying a predetermined area of a layer 10 of the liquid, said liquid layer 10 adjoining a side 11 of the construction shape 6 facing the liquid level 4, so as to obtain a solid layer 14 of the tangible object 5, the solid layer 14 thus having a predetermined shape.

The solidifying means 9 can use any suitable chemical or physical process to solidify the predetermined area of the liquid layer 10. The solidifying means 9 may for example initiate a chemical reaction of a component in the liquid which results in a solid reaction product. For example, the liquid 3 may be a liquid resin which can be cured by electro-magnetic radiation, for example a photo-polymer of which polymerisation can be activated by projecting light of a suitable wavelength. The liquid can be transformed into a solid by a suitable type of energy and the solidifying means 9 may include a source of energy which can selectively provide the energy to the predetermined area. The source of energy may for example include a source of electromagnetic radiation. The solidifying means 9 may include a light source which can emit light 15 which is projected onto the predetermined area of the liquid layer 10 via a projection unit of the solidifying means 9 in a pattern corresponding to the desired shape and size of the solid layer 14. To enable the light or other radiation 15 to enter the liquid reservoir 2, the construction shape 6 may include a window which is transparent to the radiation 15.

The system 1 further comprises separating means for separating said solid layer 14 from said construction shape 6. In the shown example, the separating means comprises a carrier plate 20 located above the construction shape 6. As indicated by double-arrow 25 in FIG. 1, the carrier plate 20 is movable up and down relative to the construction shape 6 by the action of a carrier plate actuator 21. During its movement, the carrier plate 20 can reach positions ranging from under the liquid level 4 to above it. A firstly formed solid layer 24 of the tangible object 5 is adhered to the underside of the carrier plate 20. Consecutively formed solid layers 34 are each adhered to a previously formed solid layer, respectively. Each time after solidification of a new layer, the carrier plate together with the solidified layers adhered thereon are moved upwards, as a result of which the last formed solid layer each time is being separated from the construction shape 6.

Each time after such separation, the separated solid layer 14 is furthermore moved to a predetermined position at a distance from the construction shape 6 for letting the liquid flow-in between the separated solid layer 14 and the construction shape 6. Then, by similar solidifying of a predetermined area of a similar liquid layer containing the flown-in liquid, a successive solid layer of the tangible object 5 is obtained. The moving means for this positioning movement comprises the carrier plate 20 movable by the carrier plate actuator 21.

It will be evident that the method for layerwise production of a tangible object is a cyclic method, wherein the described chronological steps of solidifying, separating and positioning together are comprised in a single cycle of the method.

The system 1 further comprises a depressurization chamber 41 defining an interior space 36. The interior space 36 contains at least one fluid, in this case not only the liquid 3 in the liquid reservoir 2, but also a gaseous fluid which is present above the liquid level 4. In the shown example, the more or less gas-tight boundaries of the depressurization chamber 41 comprise boundaries 40 which connect the carrier plate 20 with the side walls of the liquid reservoir 2. Since the carrier plate 20 is movable in the directions 25 relative to the liquid reservoir 2, these boundaries 40 comprise folding partitions, as shown. It is remarked that other arrangements are possible. For example, the internal space 36 may contain more than two different fluids. The internal space 36 of the depressurization chamber 41 may even be totally filled with only the liquid 3.

The system 1 further comprises pressure control means 42 for applying reduced pressure, relative to the outside environment, to the at least one fluid when the at least one fluid contacts layers of the object under production. In the example, the pressure control means 42 comprises a piston 43, a cylinder 44 and a piston actuator 45, the piston 43 being movable in the cylinder 44 by the piston actuator 45 in the direction of the double-arrow 26 shown in FIG. 1.

FIG. 2 shows a condition during an initial stage of said separating of the last formed layer 14 from the construction shape 6. When this separation is fast, there is a period of time in which the liquid (resin) 3 is not in equilibrium with the forces/pressures in the interspace 35 between the solid layer 14 and the construction shape 6. Then, a reduced pressure (of the vacuum or gaseous liquid) is created in said interspace 35, resulting in a force to let the liquid 3 flow in the expanding interspace 35. This condition of the interspace 35 is shown in FIG. 2. Hence, then there exists a pressure difference between the pressure in the interspace 35 and the pressure in the rest of the interior space 36. If said pressure difference is large, it is responsible for a great deal of required external force action necessary for separating the solid layer 14 from the construction shape 6. The exertion of this external force, on its turn, is responsible for an increase of internal stresses in the object during said separation.

By reducing the pressure of the gaseous fluid in the interior space 36 by means of the pressure control means 42, said pressure difference is decreased. Therefore, said required external force action and said increase of internal stresses are decreased. For example, by controlling the pressure level of the gaseous fluid above the liquid level 4 such that it decreases more and more towards the pressure level in the interspace 35, the increase of internal stresses in the object 5 can be more and more tempered. This allows that, given a maximum permissible internal stress level, a greater share of the external force is available for overcoming other types of resistances occurring during separation. In other words, applying the reduced pressure results in a smaller share of external force wasted for overcoming said pressure difference and hence in a larger share of external force available for the benefit of achieving acceleration of the separation. Hence, the separation steps in the method of producing the tangible object can be accelerated, even (and in fact especially) for objects with strongly varying cross-sections.

As mentioned above, in the shown example, the pressure control means 42 comprises a piston 43 in a cylinder 44. However, other means for controlling the pressure in the interior space 36 can also be applied, for example a pump system. An advantage of the application of a piston-cylinder arrangement is, that, during depressurization of the interior space 36, evaporated liquid components substantially remain in the interior space 36. Thereby, deterioration of the liquid by boiling or too much loss of the most volatile components of the liquid is prevented. Other ways to minimize the influences of evaporation, whether or not in combination with one another or in combination with the above described application of a piston-cylinder arrangement, include the injection of a gaseous form of at least one constituent of the liquid 3 in the pressure control chamber 41, and to design the pressure control chamber 41 such that the volume of the interior space 36 is as small as possible.

In FIG. 2 the broken line 51 refers to a predetermined position at a distance from the construction shape 6. In the positioning movement of the separated solid layer 14, the layer is moved relative to the construction shape 6 such that the bottom side of the layer 14 eventually attains the predetermined position 51. When the liquid 3 has fully flown-in between the separated solid layer 14 and the construction shape 6, a new liquid layer 50 adjoining the side 11 of the construction shape 6 is obtained. By solidifying a new predetermined area of this new liquid layer 50 a new solid layer of the tangible object 5 is obtained, the new solid layer thus having a predetermined shape.

It is remarked that, normally, there occurs directly after completion of the separation a so-called "overshoot" in the relative movement of the layer 14 and the construction shape 6. That is, in an initial stage of the positioning step, the separated solid layer and the construction shape are moved further apart than desired. This overshoot has to be compensated by moving, during a later stage of the positioning step, the separated solid layer and the construction shape closer together again. During this compensatory movement, surplus of liquid which has meanwhile entered the interspace between the separated solid layer and the construction shape, has to be forced out of this interspace again. This forcing out is time consuming, especially when the construction shape is flexible.

By applying the reduced pressure to the at least one fluid, at least the following two advantages are obtained. In the first place, the corresponding reduced pressure difference that has to be overcome during the initial stage of the separating step, results in a diminished extent of the overshoot. This occurrence of less overshoot, already in itself, accelerates the positioning step, since there is less overshoot to be compensated in the positioning step. Secondly, apart from the first advantage, applying the reduced pressure furthermore accelerates said forcing out of surplus of liquid, since in forcing out there is less pressure difference that has to be overcome.

From the above it can be concluded that the separating step of a method cycle can be accelerated by applying said reduced pressure at least temporarily during the performing of the separating step. Also it can be concluded that the positioning step of a method cycle can be accelerated by applying said reduced pressure at least temporarily during the performing of the positioning step.

Preferably, the reduced pressure applied to the at least one fluid is less than 75% of the atmospheric pressure, more preferably less than 50% of the atmospheric pressure, even more preferably less than 25% of the atmospheric pressure.

It is known that, normally, at least after the initial stage of a separating step, the liquid does only slowly flow into the interspace between the at least partly separated solid layer and the construction shape. This is due to the viscosity of the liquid in combination with the narrowness of said interspace. Hence, this aspect has a negative influence on the production speed of objects. For this reason, it is preferable when at least after a part of said separating step of the at least one such method cycle, said reduced pressure is at least temporarily increased. In this way, the liquid is stimulated to flow, under the influence of the thus obtained increased pressure difference, more rapidly into said interspace.

In the example shown in FIG. 1, the system 1 further comprises a controller 60. In the shown example, the controller 60 is communicatively connected via a connection 61 to the pressure control means 42, in this case the piston-cylinder arrangement. In this way the operation of the pressure control means 42 is controlled by the controller 60.

In the shown example, the controller 60 is also communicatively connected, via a connection 62, to the carrier plate actuator 21 for controlling the operation of the carrier plate actuator 21. Furthermore, the controller 60 is communicatively connected, via a connection 63, to the solidifying means 9 for controlling the operation of the solidifying means 9.

The controller 60 may be implemented in any suitable manner. By means of the controller 60, the controlling of the operations of the piston actuator 45, of the carrier plate actuator 21 and of the solidifying means 9 can be geared to one another for controlling the production of objects.

Optionally, the system may furthermore be arranged to control the production of objects based on a determined value of the force exerted on the carrier platform 20, or of a parameter related to the force. For that purpose, the controller 60 may for example receive a measurement value from a sensor that measures said force. However, it is also possible that the controller 60 does not receive a measured value, but a value determined from, e.g., a model of forces acting on the object 5. For example, the controller 60 may include a memory in which such a model is stored, and receive, for example from a computer communicatively connected to the controller, data representing a slice of a 3D digital model of the object. The data may subsequently be inputted to the force model to calculate the forces, for example as a function of time and control the system 1 based on the calculated forces. Based upon such determined value of the force, the progression in time of for example a separating step or a positioning step can be monitored, so that the control of the operations of the piston actuator 45 and/or of the carrier plate actuator 21 and/or of the solidifying means 9 can be further improved for faster production.

The invention may also be implemented in a computer program for running on a computer system, at least including code portions for performing steps of a method according to the invention when run on a programmable apparatus, such as a computer system or enabling a programmable apparatus to perform functions of a device or system according to the invention. Such a computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the liquid reservoir may be higher or lower than shown in FIG. 1. Furthermore, the object may have any suitable size and shape.

Also, the method and system can be arranged such that an upper layer, instead of a lower layer, of an object under production is solidified during each method cycle. Then, a carrier plate can be situated under the object under production, in stead of above it, while for example a light source of the solidifying means can be situated above the object under production, in stead of under it.

Furthermore, various kinds of separation movements are possible, that is, not only the shown separation movement in which during the separation movement the last solidified layer remains parallel to the construction shape. For example, separation movements are possible in which different local areas of contact between object and construction shape separate at different moments in time. Also separation movements are possible in different relative directions than those shown.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, the controller 60 may include a separate apparatus which controls the operation of the piston actuator 45 or of a pump system, another apparatus which controls the operation of the carrier plate actuator 21, and yet another apparatus which controls the operation of the solidifying means 9.

Also, devices functionally forming separate devices may be integrated in a single physical device. For example, the controller 60 may be implemented as a single integrated circuit.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A method for layerwise production of a tangible object, the method comprising:
    providing a liquid reservoir containing a liquid;
    providing a construction shape; and
    repeatedly performing method cycles, each method cycle comprising the successive steps of:
    solidifying a predetermined area of a layer of the liquid, said liquid layer adjoining the construction shape, so as to obtain a solid layer of the tangible object, the solid layer thus having a predetermined shape;
    separating said solid layer from said construction shape; and
    moving, relative to one another, the separated solid layer and the construction shape to a predetermined position relative to one another for letting the liquid flow-in between the separated solid layer and the construction shape so as to obtain a similar liquid layer adjoining the construction shape, the obtained similar liquid layer containing the flown-in liquid and to be used in a successive such method cycle for similar solidifying a predetermined area thereof so as to obtain a successive such solid layer adhered to the solid layer;
    wherein reduced pressure is applied relative to the atmospheric environment at least temporarily when performing of at least one of the method cycles to at least one fluid, such as the liquid in the liquid reservoir, the at least one fluid contacting layers of the object under production that were solidified in method cycles that were performed previously to the at least one such method cycle, and
    wherein, at least after a part of said separating step of the at least one of the method cycles, said reduced pressure is at least temporarily increased for stimulating the liquid to flow-in between the at least partly separated solid layer and the construction shape.

2. A method according to claim 1, wherein said reduced pressure is applied at least temporarily during the performing of at least said separating step of the at least one such method cycle.

3. The method according to claim 2, wherein said reduced pressure is applied at least temporarily during the performing of at least said positioning step of the at least one such method cycle.

4. The method according to claim 3, wherein during said applying of reduced pressure a gaseous form of at least one constituent of the liquid is injected in a depressurization chamber that contains the at least one fluid.

5. The method according to claim 3, wherein the reduced pressure applied to the at least one fluid is less than 25% of the atmospheric pressure.

6. A method according to claim 1, wherein said reduced pressure is applied at least temporarily during the performing of at least said positioning step of the at least one such method cycle.

7. A method according to claim 1, wherein during said applying of reduced pressure a gaseous form of at least one constituent of the liquid is injected in a depressurization chamber that contains the at least one fluid.

8. A method according to claim 1, wherein the reduced pressure applied to the at least one fluid is less than 75% of the atmospheric pressure.

9. A method according to claim 8, wherein the reduced pressure applied to the at least one fluid is less than 50% of the atmospheric pressure.

10. A method according to claim 9, wherein the reduced pressure applied to the at least one fluid is less than 25% of the atmospheric pressure.

11. The method according to claim 1, wherein the method is conducted by using a system comprising:
a liquid reservoir for containing a liquid therein;
a construction shape for being in contact with the liquid in the liquid reservoir;
solidifying means for solidifying a predetermined area of a layer of the liquid, said liquid layer adjoining the construction shape, so as to obtain a solid layer of the tangible object, the solid layer thus having a predetermined shape;
separating means for separating said solid layer from said construction shape;
moving means for moving, relative to one another, the separated solid layer and the construction shape to a predetermined position relative to one another for letting the liquid flow-in between the separated solid layer and the construction shape so as to obtain a similar liquid layer adjoining the construction shape, the obtained similar liquid layer containing the flown-in liquid and to be used for similar solidifying a predetermined area thereof so as to obtain a successive such solid layer adhered to the solid layer;
a depressurization chamber defining an interior space for containing at least one fluid, such as the liquid in the liquid reservoir;
pressure control means for applying reduced pressure, relative to the outside environment, to the at least one fluid when the at least one fluid contacts layers of the object under production; and
a controller arranged for controlling the operation of the solidifying means, the separating means, the moving means and the pressure control means.

12. The method according to claim 11, wherein the pressure control means comprises a piston in a cylinder.

13. A system for layerwise production of a tangible object, the system comprising: a liquid reservoir for containing a liquid therein; a construction shape for being in contact with the liquid in the liquid reservoir; solidifying means for solidifying a predetermined area of a layer of the liquid, said liquid layer adjoining the construction shape, so as to obtain a solid layer of the tangible object, the solid layer thus having a predetermined shape; separating means for separating said solid layer from said construction shape; moving means for moving, relative to one another, the separated solid layer and the construction shape to a predetermined position relative to one another for letting the liquid flow-in between the separated solid layer and the construction shape so as to obtain a similar liquid layer adjoining the construction shape, the obtained similar liquid layer containing the flown-in liquid and to be used for similar solidifying a predetermined area thereof so as to obtain a successive such solid layer adhered to the solid layer; a depressurization chamber defining an interior space for containing at least one fluid, such as the liquid in the liquid reservoir; pressure control means for applying reduced pressure, relative to the outside environment, to the at least one fluid when the at least one fluid contacts layers of the object under production; and a controller arranged and configured for controlling the operation of the solidifying means, the separating means, the moving means, and the pressure control means, to perform the method cycles of claim 1.

14. A system according to claim 13, wherein the pressure control means comprises a piston in a cylinder.

15. A system according to claim 13, wherein the controller is arranged for controlling the production of the tangible object based on a determined value of force exerted for said separating and/or said moving of the solid layer and the construction shape, or of a parameter related to the force.

16. A controller for use in a system, the controller being arranged and configured for controlling the operation of a solidifying means, a separating means, a moving means, and a pressure control means of said system, to perform the method cycles of claim 1.

17. A computer program, including program code portions provided on a data carrier to perform the function of a controller, wherein said controller being arranged and configured for controlling the operation of a solidifying means, a separating means, a moving means, and a pressure control means, to perform the method cycles of claim 1, when run on a programmable apparatus.

* * * * *